United States Patent
Levi et al.

(10) Patent No.: US 7,529,803 B2
(45) Date of Patent: May 5, 2009

(54) SEARCHING ELECTRONIC MAIL AND MESSAGES

(75) Inventors: Avner Levi, Carmiel (IL); Shmuel Ur, Shorashim (IL); Yaron Arbetman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 11/120,572

(22) Filed: May 2, 2005

(65) Prior Publication Data

US 2006/0031350 A1    Feb. 9, 2006

(30) Foreign Application Priority Data

May 7, 2004    (GB)    ................... 0410179.6

(51) Int. Cl.
   *G06F 15/16*    (2006.01)
   *G06F 17/30*    (2006.01)
(52) U.S. Cl. .......................................... 709/206; 707/3
(58) Field of Classification Search ................ 707/3; 709/206

See application file for complete search history.

(56) References Cited

U.S. PATENT DOCUMENTS

| | | | |
|---|---|---|---|
| 6,629,100 B2 * | 9/2003 | Morris et al. | 707/10 |
| 7,363,295 B2 * | 4/2008 | Szeto et al. | 707/3 |
| 7,412,437 B2 * | 8/2008 | Moody et al. | 707/3 |
| 2003/0028524 A1 * | 2/2003 | Keskar et al. | 707/3 |
| 2003/0061209 A1 * | 3/2003 | Raboczi et al. | 707/3 |
| 2003/0158839 A1 * | 8/2003 | Faybishenko et al. | 707/3 |
| 2004/0064511 A1 * | 4/2004 | Abdel-Aziz et al. | 709/206 |
| 2004/0088286 A1 * | 5/2004 | Hackleman et al. | 707/3 |
| 2005/0004985 A1 * | 1/2005 | Stochosky | 709/205 |
| 2005/0198144 A1 * | 9/2005 | Kraenzel et al. | 709/206 |
| 2007/0016559 A1 * | 1/2007 | Kraft | 707/3 |

OTHER PUBLICATIONS

Doval, Diego and O'Mahony, Donal. "Overlay Networks: A Scalable Alternative for P2P", Jul. 2003, IEEE.*
Crispin, M. "RFC 3501: Internet Message Access Protocol—Version 4rev1". Mar. 2003. University of Washington.*
Morimoto et al. "Microsoft Windows Server 2003 Insider Solutions". Nov. 26, 2003. pp. 1-7.*

* cited by examiner

*Primary Examiner*—Larry D Donaghue
*Assistant Examiner*—Bryan Lee
(74) *Attorney, Agent, or Firm*—Richard M. Goldman; Shimokaji & Associates

(57) ABSTRACT

A method for recovering information from electronic communications, including conveying an indication of a topic of interest, from a searcher on the topic, to a computing system storing a first set of the communications of a first communicator, and searching within the first set, in response to the indication, to identify one or more first communications on the topic of interest, thereby defining a primary sub-set of communications. The method further includes determining identities of one or more second communicators who participated in the primary sub-set, searching within a second set of the communications of the one or more second communicators, in response to the indication, to identify one or more second communications on the topic of interest, thereby defining a secondary sub-set of communications, the second set of the communications being stored in the computing system, and conveying information from the searches to the searcher.

10 Claims, 5 Drawing Sheets

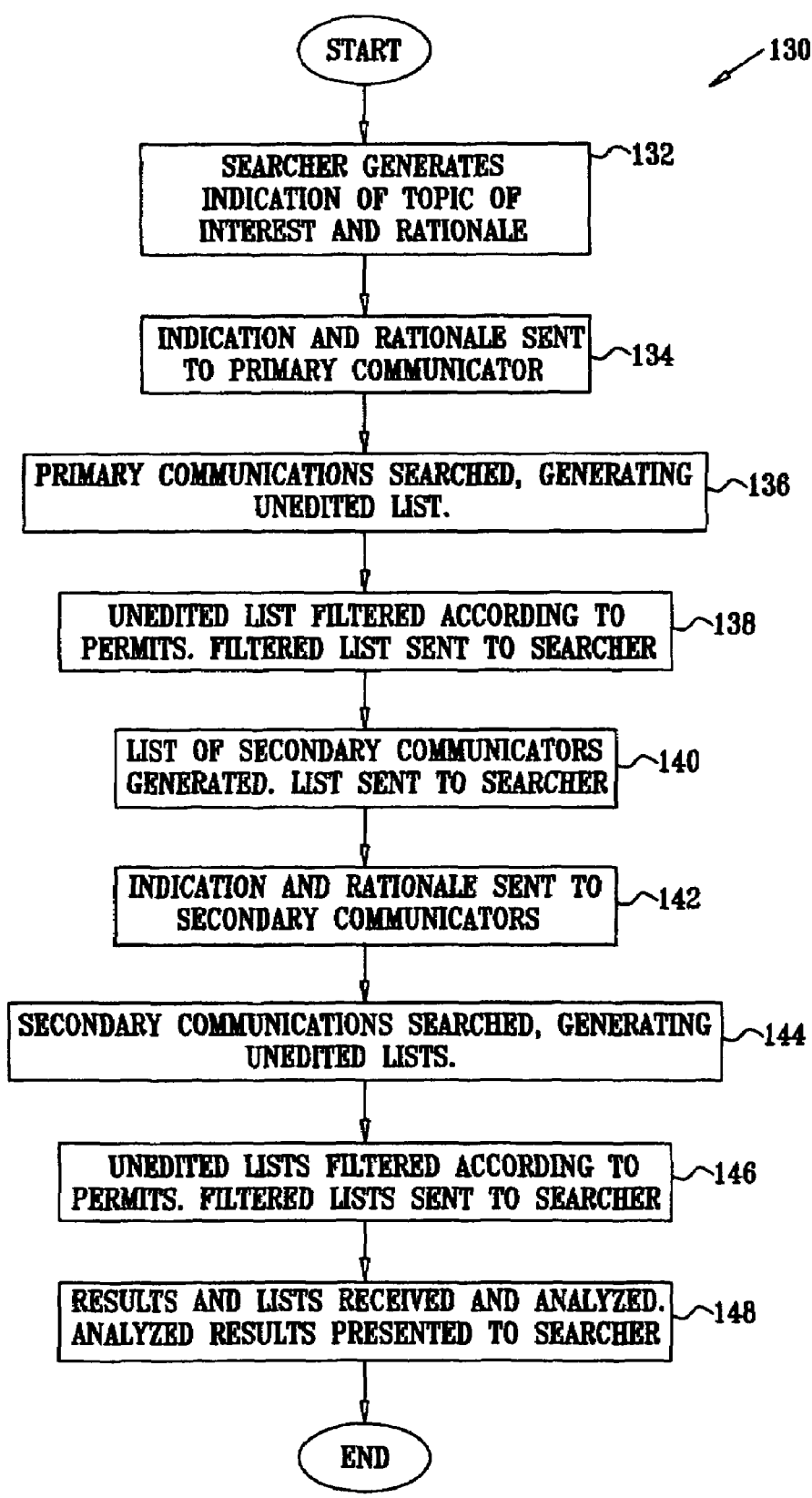

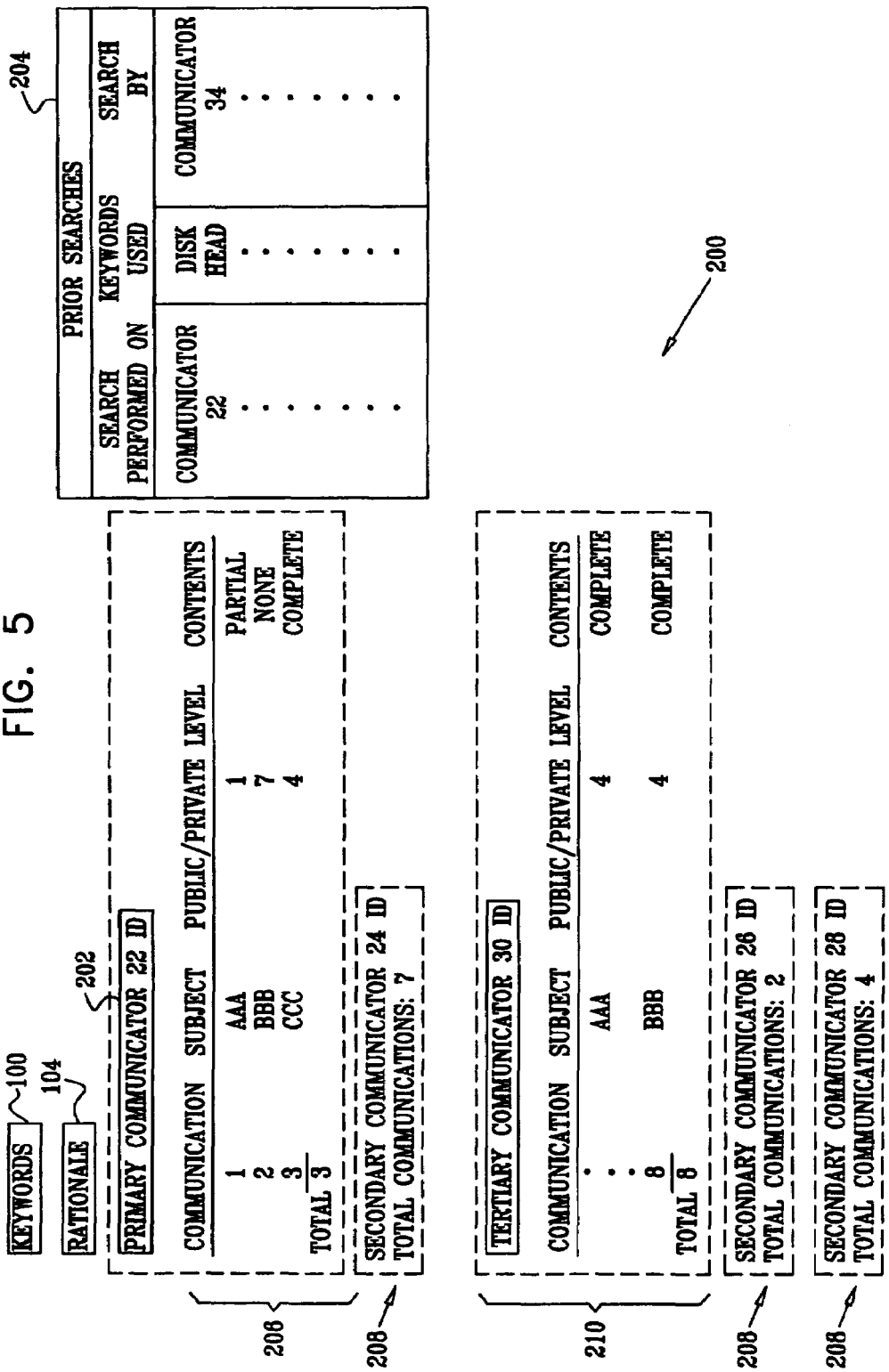

SEARCHING ELECTRONIC MAIL AND MESSAGES

FIELD OF THE INVENTION

The present invention relates generally to mining information, and specifically to mining information from electronic communications.

BACKGROUND OF THE INVENTION

Electronic mail (email) and peer-to-peer instant messaging (chats) are some of the predominant electronic communication tools used for transferring text today. Both email and chat communications may typically contain information of interest to third parties, i.e., those who are not directly involved in the original dissemination of the communication.

Methods for searching email and/or chat communications in order to simplify the gathering of information contained in the communications are known in the art. KVS, of Berkshire, UK, produces "Enterprise Vault™" software, which archives and indexes email and allows searches of the archived email by meta-data (information apart from the content of the email such as subject, sender, or recipient), content of the email, and attachments to the email. IBM Corporation, of Armonk, N.Y., produces "DB2® Content OnDemand" software which manages and permits indexing of email. The software allows searching according to indexed fields, and emails may be retrieved according to results of the searches.

A software package termed "Mutt," which may be found at http://mutt.blackfish.org.uk, enables tagging the contents of email messages. Mutt also enables emails to be searched using a variety of search methods, including incorporation of "wildcards" in the searches.

An article on "TeamWave Workplace 4.2" software, and an article on a related project TeamRooms, may be found at http://www.macupdate.com/info.php/id/2520 and at http://www.cpsc.ucalgary.ca/grouplab/projects/TeamRooms.html. The articles describe how a virtual room for meetings may be provided. People can leave messages, documents and annotations for others, or work on them together when occupying the room at the same time.

An article entitled "Email as Spectroscopy: Automated Discovery of Community Structure within Organizations," by Tyler et al., published in December 2003 by HP Labs (Hewlett Packard Corp., Palo Alto, Calif.), which is incorporated herein by reference, may be found at http://www.hpl.hp.com/research/idi/papers/. The article describes construction of a network of relationships between email users, by using the names of the sender and the receiver of each email analyzed.

Databases listing interests and roles of personnel in a company are known in the art. For example, IBM Corporation maintain a "Persona Page" database which is accessed within an intranet. In the database, employees may list an email address and project information.

U.S. Pat. No. 6,581,072 to Mathur, et al., whose disclosure is incorporated herein by reference, describes methods for identifying and accessing electronic documents stored in a network environment. Documents of interest to a user may be identified and accessed, without compromising the user's privacy, by a user system which receives index information concerning the documents.

SUMMARY OF THE INVENTION

In embodiments of the present invention, electronic communications, such as emails, are searched to find communications which are relevant to a topic of interest. The search is initiated by a searcher, and is performed over sets of communications of a number of senders/recipients, herein termed communicators, starting with the set of communications of a first communicator. The search finds a sub-set of the first communicator's communications on the topic of interest, and searches the sub-set to identify further communicators, and their communications, on the topic.

The searcher wishing to recover information on the topic of interest conveys an indication of the topic, typically in the form of one or more keywords describing the topic, to a computing system in which is stored a first communicator's set of communications. The indication is used for searching the first communicator's set of communications, so as to determine a primary sub-set of the communications that are relevant to the topic. Each communication in the primary sub-set has a second communicator—a sender or recipient—and the search is continued by searching in their communications, also stored in the computing system, to determine secondary sub-sets. The process may be repeated for subsequent levels of communicators. The searcher receives search results in the form of the sub-sets of communications on the topic, together with identities of the second and subsequent communicators and how they are connected to each other and to the first communicator. The results thus provide the searcher with a detailed picture of activity on the topic of interest.

The computing system comprises a network which is coupled to one or more storage units for the communications. The storage units may comprise a server, or separate computers of the respective communicators, or a combination of a server and at least some separate computers.

Each communicator may apply a public/private classification to his or her communications, or to parts thereof, prior to the communications being searched. Classifications may range from a completely public to a completely private category, and typically include sub-categories between the two end-points of the range. The completely public classification typically allows all details of a communication to be searched and/or made available to other communicators. The completely private classification typically allows no details of a communication to be searched and/or made available to other communicators. The classification may be applied by attaching a permit to the complete (or the partial) communication.

The searcher may send, together with the topic of interest, a rationale describing one or more objects of the search. As a result of the search, the rationale may be provided to the communicators found by the search. Receipt of the rationale may motivate these communicators to communicate with the searcher regarding the objects of the search, and to provide the searcher with more information, such as communications or parts thereof that may have been classified as private.

There is therefore provided, according to an embodiment of the present invention, a method for recovering information from a plurality of electronic communications, each conveyed from a respective sender to a respective recipient having respective identities, and stored in at least one memory together with the identities, the method including:

conveying an indication of a topic of interest, from a searcher on the topic, to a computing system in which is stored a first set of the communications in which a first communicator has participated;

searching within the first set of the communications, in response to the indication, to identify one or more first communications that are relevant to the topic of interest, thereby defining a primary sub-set of the communications including the one or more first communications;

determining identities of one or more second communicators who participated in the communications in the primary sub-set;

searching within a second set of the communications in which one of the one or more second communicators has participated, in response to the indication, to identify one or more second communications that are relevant to the topic of interest, thereby defining a secondary sub-set of the communications including the one or more second communications, the second set of the communications being stored in the computing system; and conveying information from at least some of the primary sub-set, the secondary sub-set, and the identities of the one or more the second communicators, to the searcher.

The computing system may include a server wherein are stored the first and the second set of communications.

The computing system may include:

a first computer wherein are stored the first set of communications; and a second computer wherein are stored the second set of communications, and wherein conveying the indication of the topic of interest may include:

conveying the indication to the first computer; and conveying the indication to the second computer.

Conveying the indication may include conveying a rationale of a search for the information to at least one of the first and the second communicators.

The method may further include:

determining, in an iterative manner, identities of one or more subsequent communicators in response to the indication;

searching, in an iterative manner, within a subsequent set of the communications in which one of the one or more subsequent communicators has participated, in response to the indication, to identify one or more subsequent communications that are relevant to the topic of interest, thereby defining a subsequent sub-set of the communications including the one or more subsequent communications, the subsequent set of the communications being stored in the computing system; and conveying information from at least some of the subsequent sub-set, and the identities of the one or more subsequent communicators, to the searcher.

The method may also include limiting a number of levels of the second and subsequent sets of communications which are to be searched.

The method may include saving records of details of a prior search with at least one of the first and the second set of the communications, wherein searching within the first and the second set of the communications includes determining that at least some of the details of the prior search have a relation to the indication, and providing at least some of the details of the prior search to the searcher in response to the relation.

The method may further include assigning each of the communications in the first and the second set of communications a privacy level, and searching within the first and the second set of communications may include searching in response to the respective privacy levels.

At least one of the communications may include a first text and the indication may include a second text, and searching within the first and the second set of communications may include finding a match between the first text and the second text, and conveying the information may include conveying at least part of the first text.

The at least one of the communications may further include at least one of audio and graphic information, and conveying the information may include conveying the at least one of the audio and the graphic information.

There is further provided, according to an embodiment of the present invention, apparatus for recovering information from a plurality of electronic communications, each conveyed from a respective sender to a respective recipient having respective identities, including:

a computing system, including:

at least one memory in which are stored the communications together with the respective identities; and a processing unit, which is adapted to:

convey an indication of a topic of interest, from a searcher on the topic, to a first set of the communications in which a first communicator has participated;

search within the first set of the communications, in response to the indication, to identify one or more first communications that are relevant to the topic of interest, thereby defining a primary sub-set of the communications including the one or more first communications;

determine identities of one or more second communicators who participated in the communications in the primary sub-set;

search within a second set of the communications in which one of the one or more second communicators has participated, in response to the indication, to identify one or more second communications that are relevant to the topic of interest, thereby defining a secondary sub-set of the communications including the one or more second communications; and convey information from at least some of the primary sub-set, the secondary sub-set, and the identities of the one or more the second communicators, to the searcher.

The computing system may include a server wherein are stored the first and the second set of communications.

The computing system may include:

a first computer wherein are stored the first set of communications; and a second computer wherein are stored the second set of communications, and conveying the indication of the topic of interest may include:

conveying the indication to the first computer; and conveying the indication to the second computer.

Conveying the indication may include conveying a rationale of a search for the information to at least one of the first and the second communicators.

The processing unit may be adapted to:

determine, in an iterative manner, identities of one or more subsequent communicators in response to the indication;

search, in an iterative manner, within a subsequent set of the communications in which one of the one or more subsequent communicators has participated, in response to the indication, to identify one or more subsequent communications that are relevant to the topic of interest, thereby defining a subsequent sub-set of the communications including the one or more subsequent communications; and convey information from at least some of the subsequent sub-set, and the identities of the one or more subsequent communicators, to the searcher.

The apparatus may limit a number of levels of the second and subsequent sets of communications which are to be searched.

The processing unit may be adapted to save records of details of a prior search with at least one of the first and the second set of the communications, and searching within the first and the second set of the communications may include determining that at least some of the details of the prior search have a relation to the indication, and providing at least some of the details of the prior search to the searcher in response to the relation.

Each of the first and the second set of communications may be assigned a respective privacy level, and searching within the first and the second set of communications may include searching in response to the respective privacy levels.

At least one of the communications may include a first text and the indication may include a second text, and searching within the first and the second set of communications may include finding a match between the first text and the second text, and conveying the information may include conveying at least part of the first text. The at least one of the communications may include at least one of audio and graphic information, and conveying the information may include conveying the at least one of the audio and the graphic information.

There is further provided, according to an embodiment of the present invention, a computer software product, including a computer-readable medium in which computer program instructions are stored, which instructions, when read by a computer, cause the computer to:

convey an indication of a topic of interest, from a searcher on the topic, to a computing system in which is stored a first set of communications in which a first communicator has participated, the communications being included in a plurality of electronic communications, each conveyed from a respective sender to a respective recipient having respective identities, and stored in at least one memory together with the identities;

search within the first set of the communications, in response to the indication, to identify one or more first communications that are relevant to the topic of interest, thereby defining a primary sub-set of the communications including the one or more first communications;

determine identities of one or more second communicators who participated in the communications in the primary subset;

search within a second set of the communications in which one of the one or more second communicators has participated, in response to the indication, to identify one or more second communications that are relevant to the topic of interest, thereby defining a secondary sub-set of the communications including the one or more second communications, the second set of the communications being stored in the computing system; and convey information from at least some of the primary sub-set, the secondary sub-set, and the identities of the one or more the second communicators, to the searcher.

The present invention will be more fully understood from the following detailed description of the preferred embodiments thereof, taken together with the drawings, a brief description of which follows.

BRIEF DESCRIPTION OF THE DRAWINGS

FIG. 4 is a flowchart showing steps involved in performing the search process of FIGS. 1 and 2, according to an embodiment of the present invention; and FIG. 5 is a schematic representation of results produced by the flowchart of FIG. 5, according to an embodiment of the present invention.

DETAILED DESCRIPTION OF EMBODIMENTS

Figure 1:
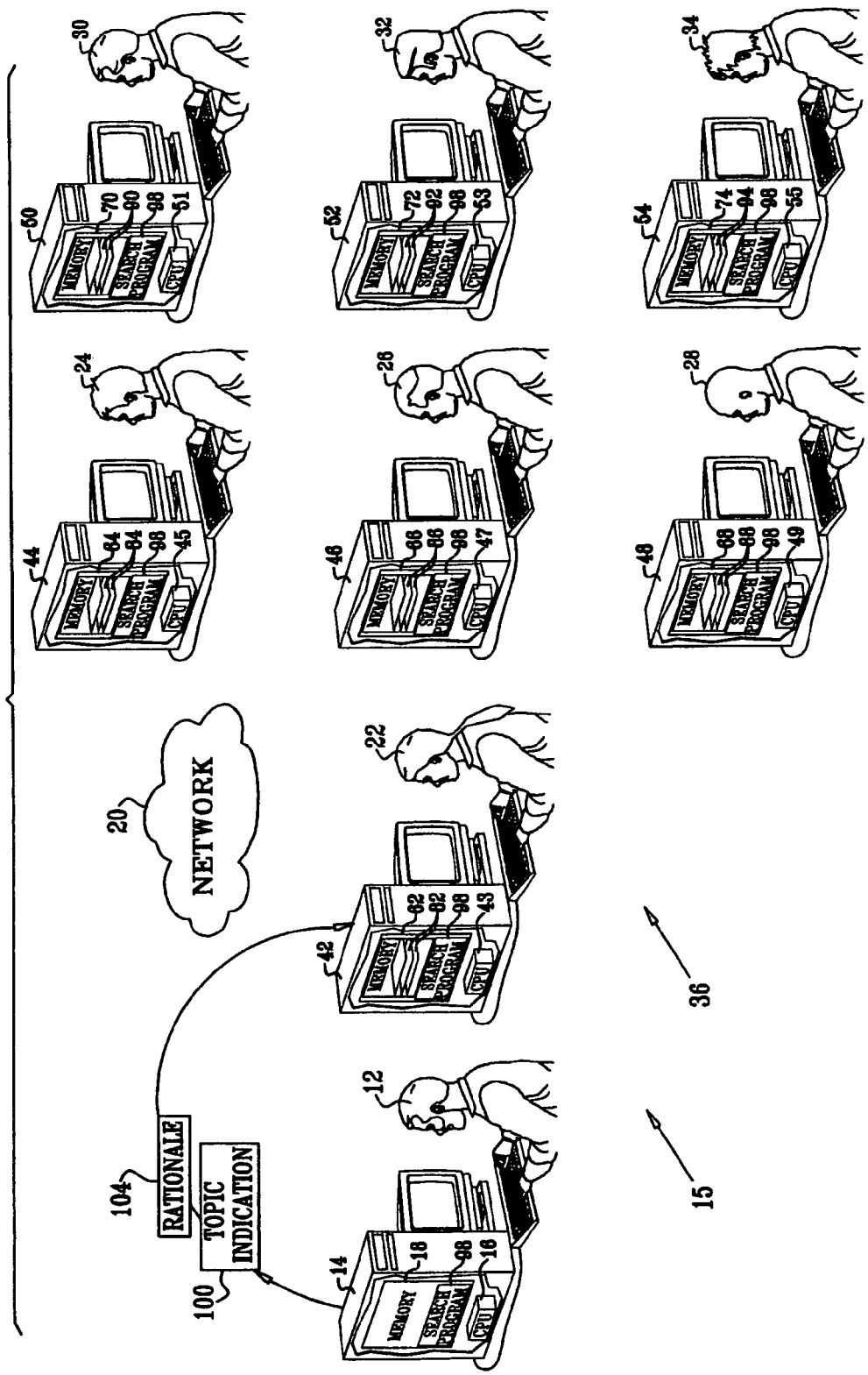
FIG. 1 is a schematic diagram illustrating a first computing system, according to an embodiment of the present invention.

Reference is now made to FIG. 1, which is a schematic diagram illustrating a computing system 15, according to an embodiment of the present invention. Computing system 15 is comprised of computers 14, 42, 44, 46, 48, 50, 52, and 54 coupled to a network 20, such as the Internet and/or one or more networks typically operated by a business or an organization.

A searcher 12 sends and receives electronic communications, typically in the form of electronic mail (email) and/or instant peer-to-peer messages (chats) using computer 14. The computer comprises a central processing unit (CPU) 16 and a memory 18 wherein the communications may be stored. Computer 14 typically comprises an industry-standard personal computer having software for performing searches and analyses of communications as described hereinbelow. The software may be provided to computer 14 as a computer software product in a tangible form on a computer-readable medium such as a CD-ROM, or as an electronic data transmission, or as a mixture of both forms.

Each electronic communication sent or received by searcher 12 involves the participation of at least one second person, to whom the communication is directed or from whom the communication is received. Senders and receivers of electronic communications are herein also termed communicators. In the specification and in the claims, the term "electronic communication" comprises chats, emails and any attachments thereto, as well as any other form of electronic message comprising encoded information sent from a sender to a recipient, and wherein respective identities of the sender and recipient and at least part of the communication such as a title, subject, or description of the communication are stored in the form of text in a memory such as memory 18. Other electronic communications comprise, but are not limited to, small messaging service (SMS) messages, graphics, and audio, or combinations of these and other types of informative electronic transfer having an identified sender, recipient, and at least part of the communication in text form. In the embodiments described hereinbelow, unless otherwise stated, electronic communications are referred to as communications.

Communicators other than searcher 12, herein assumed to be communicators 22, 24, 26, 28, 30, 32, and 34, and generically referred to as communicators 36, use respective computers 42, 44, 46, 48, 50, 52, and 54 having respective CPUs 43, 45, 47, 49, 51, 53, and 55 and memories 62, 64, 66, 68, 70, 72, and 74.

Communicators 36 store respective sets 82, 84, 86, 88, 90, 92, and 94 of communications in memories 62, 64, 66, 68, 70, 72, and 74. A substantially similar search program 98 is stored within each of the memories and in memory 18; the function of program 98 is described in more detail below.

Figure 2:
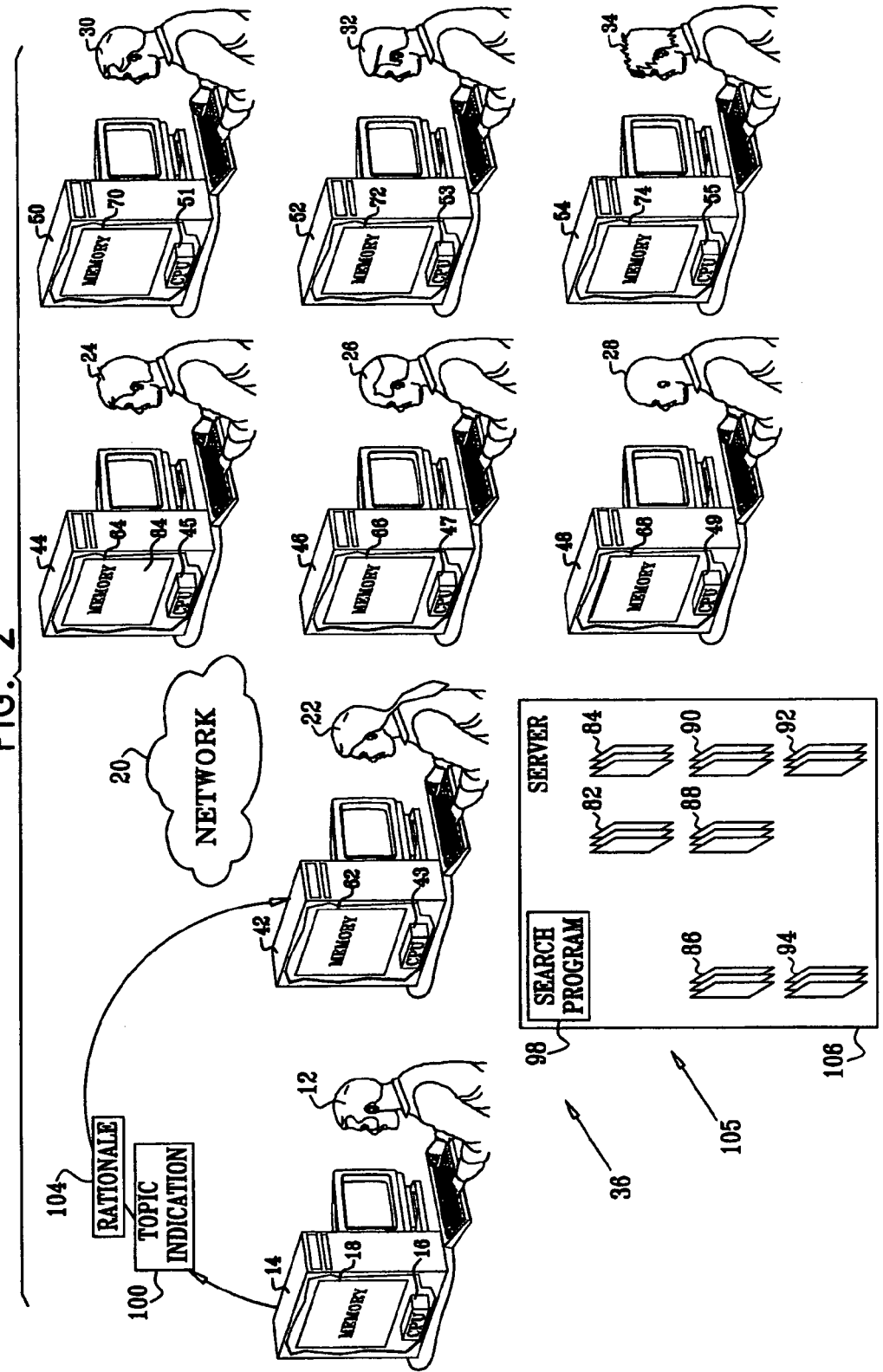
FIG. 2 is a schematic diagram illustrating a second computing system, according to an embodiment of the present invention.

FIG. 2 is a schematic diagram illustrating a computing system 105, according to an embodiment of the present invention. Apart from the differences described below, the operation of system 105 is generally similar to that of system 15 (FIG. 1), such that elements indicated by the same reference numerals in both systems 15 and 105 are generally identical in construction and in operation. System 105 comprises a server 106 coupled to network 20. Sets 82, 84, 86, 88, 90, 92, and 94 of communications may be stored in server 106 or may be distributed between the server and the respective computers of communicators 36. Similarly, search programs 98 may be stored in server 106 or distributed between the server and the respective computers.

Figure 3:
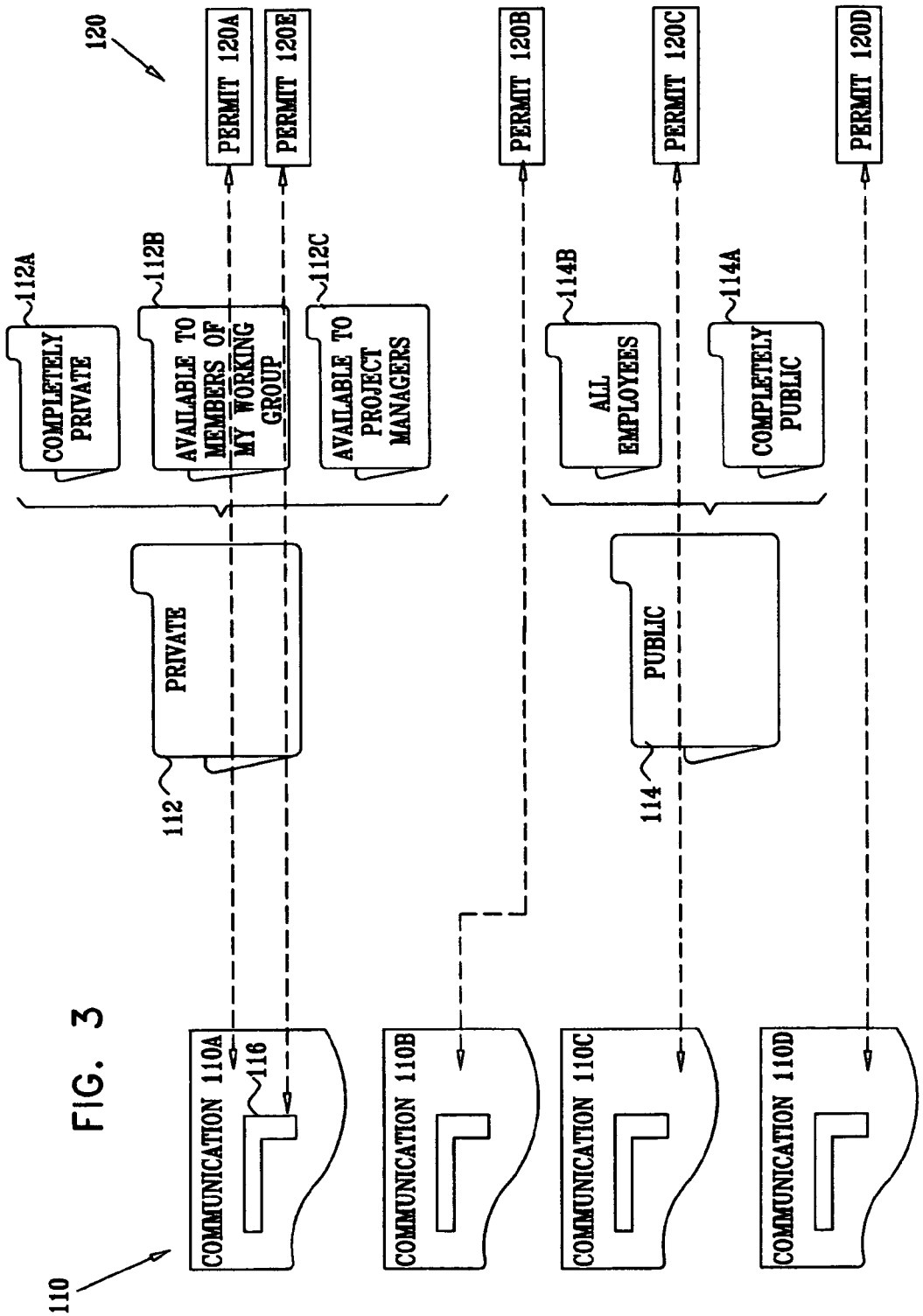
FIG. 3 is a schematic diagram illustrating classifications and priorities that may be assigned to a communication, according to an embodiment of the present invention.

FIG. 3 is a schematic diagram illustrating classifications and priorities that may be assigned to a communication, according to an embodiment of the present invention. Communications 110, herein separately identified as communications 110A, 110B, 110C, 110D may be saved in a folder 112 classified as private, or a folder 114 classified as public, the folders being implemented in a memory of one of the computers of communicators 36 and/or in server 106, according to which system—system 15 or system 105—is operative. Alternatively or additionally, the sender or receiver of communication 110 may classify the communication itself as public or private, for example by setting a flag 111 applied to the communication, or by some other suitable classification method known in the art. Retrieval of a communication from a folder, as is described below with reference to FIG. 4, most preferably maintains the most private level that has been applied to the communication—by either placement in a folder or by being specifically classified.

In an alternative embodiment of the present invention, the classifications of the communications described above may be divided into sub-classifications. For example, the private classification may comprise sub-classifications "completely private" 112A, "available to members of my working group" 112B, and "available to project managers" 112C; and the public classification may comprise sub-classifications "completely public" 114A, and "all employees of my organization," 114B. The classifications and/or sub-classifications are typically prioritized from a highest, completely private, to a lowest, completely public, level. In the course of transmission of a communication—for example a communication having a first recipient may be forwarded to one or more second recipients—any classification or sub-classification may typically be maintained or raised in level. In some embodiments of the present invention, the sender or receiver of one of communications 110 may apply the classifications described above to a part 116 of the communication.

Communicators 36 assign respective permits 120 so as to define respective privacy levels, derived from the classifications described above, for each of their communications or parts thereof. Permits 120 are separately referred to herein as permits 120A, 120B, 120C, 120D, and 120E, which are respectively assigned to communications 110A, 110B, 110C, 110D, and 116. Permits 120 are used by program 98 to decide which information concerning a specific communication or part may be transferred and provided to a third party. Permits 120 may vary from a permit allowing all information to be transferred/published, to a permit allowing no information to be transferred/published. For example, a first intermediate permit may allow the subject and communicators of a communication, but not the content, to be transferred/published. A second intermediate permit, more restrictive than the first, may allow the subject and the communicators to only be transferred to one or more specified third parties. Other permits, delineating information associated with a communication and to whom the information may be transferred, will be able to be defined by those skilled in the art; all such permits are assume to be included in the scope of the present invention.

In some embodiments of the present invention, program 98 may be configured so that regardless of the permit applied to a communication, at least some of the information comprised in the communication may be utilized by the program. For example, program 98 may be pre-set so that the program may use information, such as the title and/or date of a communication which has been assigned a completely private permit.

FIG. 4 is a flowchart 130 showing steps involved in performing a communications search, according to an embodiment of the present invention. Returning to FIGS. 1 and 2, searcher 12 is assumed to want to receive information on a topic of interest to the searcher. In order to receive the information, searcher 12 generates an indication 100 of the topic of interest. The indication typically comprises keywords and/or phrases or other text which are relevant to the topic and which help to differentiate the topic from topics not of interest to searcher 12. For example, searcher 12 may be interested in the topic of disk technology, specifically on types and properties of heads used to read and write to hard disks. Indication 100 that searcher 12 provides may typically comprise words and/or phrases chosen from "hard disk," "read, write disk head," and "seek time." Those skilled in the art will be able to formulate appropriate indications 100 for other topics of interest. Searcher 12 may also generate a rationale 104 for performing the search. Rationale 104 most preferably includes an identifier, such as an email address, of the searcher. For example, rationale 104 may comprise a sentence: "I am interested in reducing the size of disk heads." In flowchart 130 it is assumed that rationale 104 is generated, and as described in more detail below, the rationale may be provided to communicators discovered/located in the search.

In a first step 132, searcher 12 uses computer 14 to invoke search program 98 and generate the indication of the topic of interest. Searcher 12 also generates a rationale 104 for the search.

To initiate the search, in a second step 134 searcher 12 conveys indication 100, together with rationale 104, to one of communicators 36, so as, if system 15 is operative, to invoke search program 98 of the computer of the chosen communicator 36. It will be understood that, if system 105 is operative, search program 98 will have been invoked in step 132. It will also be understood that conveying the indication to one of communicators 36 comprises transferring the indication electronically within computing system 15 or computing system 105 and indicating the chosen communicator 36.

The communicator to whom indication 100 is sent from searcher 12 is herein termed a primary communicator. By way of example, communicator 22 is assumed to be the primary communicator. Typically, the primary communicator will be a communicator who searcher 12 is aware of having information on the topic of interest. In an embodiment of the invention, searcher 12 determines a primary communicator using a data base known to the searcher to include communicators who may have information on the topic of interest. The primary communicator is most preferably notified of the identity of the searcher, and of the rationale, by any suitable method known in the art.

In a third step 136, search program 98 uses indication 100 to search through communication set 82, by finding matches between indication 100 and text comprised in the content or meta-data, such as a subject or title of the communication, of communications in set 82. The search generates an initial unedited list of the primary communicator's communications which are on the topic of interest. The unedited list comprises, for each communication found, text of the communication, any attachments of the communication, and meta-data associated with the communication, such as the sender and the recipient (one of whom will be the primary communicator), subject and date and time of the communication.

In a fourth step 138, search program 98 filters the unedited list according to the permits 120 assigned to each communication and according to any pre-set configuration of program 98, as described above, so as to generate a filtered list of communications. The filtered list is transmitted to computer 14. The filtered list and/or the unedited list of step 136 are also used for continuing the search, as is described below.

In a fifth step 140, search program 98 prepares a list of secondary communicators. The secondary communicators are communicators, not including the primary communicator or searcher 12, of communications of the unfiltered list or of the filtered list, depending on the permits 120 assigned to the communications found in the search, and on any pre-set configuration of program 98. By way of example, communicators 24, 26, and 28 are assumed to be secondary communicators. It will be understood that even if permission has not been granted for contents of a communication to be published/transferred by the permit 120 of the communication, the communicators of such a communication may be used as secondary communicators. The list of secondary communicators is sent to computer 14.

In a sixth step 142, indication 100 and rationale 104 are conveyed to the secondary communicators, who are notified of the rationale and of the identity of the searcher. Conveyance of the indication and rationale is preferably as described above with reference to step 134, and notification is preferably by a method substantially similar to that used in step 134.

In a seventh step 144, respective communications 84, 86, and 88 of each of the secondary communicators are searched, using one or more programs 98 and indication 100. The searches generate respective unedited lists of the secondary communications on the topic of interest. The unedited lists are comprised of elements substantially similar to those described in step 136 above.

In an eighth step 146, the one or more programs 98 filter the unedited lists according to the permits 120 assigned to each communication comprised in the lists, and according to any pre-set configuration of program 98, so as to generate respective filtered lists of communications. The filtered lists are transmitted to computer 14.

In some embodiments of the present invention, the unedited lists generated in steps 136 and 144 may be sent to computer 14.

In a final step 148, the results and lists from steps 138, 140, and 146, and from steps 136 and 144 if they have been sent, are analyzed by computer 14, to generate one or more summaries of the search performed. Preferably, the summaries are presented to searcher 12 in the form of one or more interactive tables or graphic displays, an example of which is shown in FIG. 5, wherein the searcher is able to inspect the lists and results determined in the search.

It will be understood that the search process described with respect to flowchart 130 may be continued in an iterative manner, from the secondary communicators, to tertiary and subsequent level communicators, such as communicators 30 and 32, using similar methods to those described for steps 134, 136, 138, and 140, mutatis mutandis. In an embodiment of the present invention, search program 98 incorporates a search parameter, which may be set by searcher 12; limiting the number of levels which are to be searched.

In an embodiment of the present invention, program 98 is configured to record, for subsequent use, details of searches made. Thus, if system 15 is operative, each program 98 is preferably so configured; if system 105 is operative, program 98 on server 106 is preferably so configured. For example, before the search by searcher 12, described above with reference to flowchart 130, a prior search may have been made by communicator 34. The prior search is assumed to have been directed to communicator 28 as the primary communicator, with an indication including at least one of the keywords of indication 100, such as "disk head," so that the prior search is related to the search of searcher 12. Program 98 records the details of the prior search, such as the identity of the searcher, the indication used, and identities of communicators determined by the prior search. The details may be provided to a subsequent search such as the search described above with reference to flowchart 130. It will be appreciated that such provision may supply useful information about other communicators, such as communicator 34, to searcher 12. Most preferably, program 98 is configured to treat the recorded details of previous searches as generally similar to communications so that, in addition to searching communications of communicators 36 as described above, searches of details of previous searches are also made by program 98.

FIG. 5 is a schematic representation of results 200 produced by flowchart 130, according to an embodiment of the present invention. The results are typically presented by program 98 to searcher 12 on a monitor of computer 14. Results 200 show indication 100, in the form of keywords used, and rationale 104. A primary communicator identity 202 corresponds to the identity of communicator 22, and details 206 of communications of the primary communicator found in the search are presented in an expanded form. The details typically comprise a subject, a privacy level which is typically numbered to indicate the level, and contents of the communication that are available to searcher 12. Searcher 12 is able to retrieve the contents, typically by clicking on the text showing the available contents. Results 200 also illustrate that a related prior search had been made on communications of communicator 22 by communicator 34, and the keywords used and identity of the searcher are presented to searcher 12 in a prior search information box 204.

Details of the identities and communications of secondary communicators 24, 26, 28 are presented in a compressed form 208. Most preferably, the compressed form details may be converted to an expanded form similar to details 206, and contents of each of the secondary communications found may be recovered by searcher 12. An example of the communications of tertiary communicator 30 are shown in an expanded form 210.

It will be appreciated that search results may be presented in other forms than that exemplified by FIG. 5. For example, identities of communicators found in a search may be displayed, and links drawn between the communicators to indicate communications. Other methods for presenting results will be apparent to those skilled in the art.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for recovering information from a plurality of electronic communications,
   each of said communications conveyed from a respective sender to a respective recipient, each of said senders and said recipients having respective identities, a searcher selecting said respective sender or said recipient from a database of said senders and said respective recipients, and stored in at least one memory together with the identities, the method comprising:

determining a first communicator from a database of communicators, known by the searcher to have knowledge on a topic of interest;

configuring communications permits for a program such that the program permits override the communications permits;

conveying an indication of a topic of interest, from a searcher on a topic, to a computing system in which is stored a first set of the communications in which the first communicator has participated, wherein said first communicator is said sender or said recipient, wherein said indication comprises keywords and phrases relevant to said topic of interest, and setting permit levels to determine whether said electronic communications may be transferred or published in whole or in part;

searching within the first set of the communications, in response to the indication, to identify one or more first communications that are relevant to the topic of interest;

defining a primary sub-set of the communications comprising the one or more first communications, said primary sub-set of said first set of communications is a list for said first set of the communications, comprising: text of said first set of communications, attachments of said first set of communications, identifiers of said sender and said recipient, subject of said first set of communications, and date and time of said first set of communications;

filtering said primary sub-set according to said permit levels;

determining identities of one or more second communicators who participated in the communications in the primary sub-set, wherein said second communicators are said sender or said recipient;

conveying said indication of a topic of interest to said second communicators;

searching within a second set of the communications in which one of the one or more second communicators has participated, in response to the indication, to identify one or more second communications that are relevant to the topic of interest;

defining a secondary sub-set of the communications comprising the one or more second communications, the second set of the communications being stored in the computing system;

filtering said secondary sub-set according to said permit levels;

defining a next level sub-set of the communications comprising the one or more next set of communications, the next set of the communications being stored in the computing system;

filtering said next level sub-set according to said permit levels;

conveying information from at least some of the filtered primary sub-set, the filtered secondary sub-set, and the identities of the one or more of the second communicators, to the searcher, wherein said identities include said second communicators whether or not said second communication is allowed by said permit level to transfer or publish; and preparing summaries of said primary sub-set and secondary subset and sending said summaries to said searcher, wherein said summaries include interactive tables and graphic displays, wherein said summaries include said topic of interest, said permit level, and contents of said electronic communication in compressed form, and wherein the total contents of said electronic communication are displayed to said searcher selecting said summary for said electronic communication and displaying information that a related prior search had been made on communications of a displayed communicator.

2. The method according to claim 1, wherein the computing system comprises a server wherein are stored the first and the second set of communications.

3. The method according to claim 1, wherein the computing system comprises:

a first computer wherein are stored the first set of communications; and a second computer wherein are stored the second set of communications, and wherein conveying the indication of the topic of interest comprises:

conveying the indication to the first computer; and conveying the indication to the second computer.

4. The method according to claim 1, wherein conveying the indication comprises conveying a rationale of a search for the information to at least one of the first and the second communicators electronically within a computer system, wherein said rationale includes the email address of said searcher, and said rationale is sent to said first and second communicators.

5. The method according to claim 1, further comprising:

determining, in an iterative manner, identities of one or more subsequent communicators who participated in the communications in the primary sub-set and secondary sub-set in response to the indication, wherein said subsequent communicators are said sender or said recipient;

searching, in an iterative manner, within a subsequent set of the communications as done with the primary and secondary levels of communicators and communications in which one of the one or more subsequent communicators has participated, in response to the indication, to identify one or more subsequent communications that are relevant to the topic of interest, thereby defining a subsequent sub-set of the communications comprising the one or more subsequent communications, the subsequent set of the communications being stored in the computing system; and conveying information from at least some of the subsequent sub-set, including a topic of interest, and the identities of the one or more subsequent communicators, to the searcher.

6. The method according to claim 5, further comprising setting a search parameter determined by the searcher limiting a number of levels of the second and subsequent sets of communications which are to be searched.

7. The method according to claim 1, further comprising saving records of details of a prior search with at least one of the first and the second set of the communications, and wherein searching within the first and the second set of the communications comprises:

determining that at least some of the details of the prior search have a relation to the indication, and providing at least some of the details of the prior search to the searcher in response to the relation, wherein summaries are created that include a listing of prior searches made by said searcher, including said topic of interest used and the identity of said searcher; and searching the prior searches in addition to searching the communications.

8. The method according to claim 1, further comprising assigning each of the communications in the first and the second set of communications a privacy level, and wherein searching within the first and the second set of communications comprises searching in response to the respective privacy levels, wherein said electronic communications are classified as one of: public, or private, wherein said private classification of said electronic communications are sub-classified as completely private, available to members of working group, or available to project managers, wherein said public classification of said electronic communications are sub-classified as completely public, or all employees of an organization, and wherein said electronic communications classifications are applied to only a part of said electronic communications.

9. The method according to claim 1, wherein at least one of the communications comprises a first text and wherein the indication comprises a second text, and wherein searching within the first and the second set of communications comprises finding a match between the first text and the second text, and wherein conveying the information comprises conveying at least part of the first text, wherein said electronic communications comprise small messaging service messages.

10. The method according to claim 9, wherein at least one of the communications comprises at least one of audio and graphic information, or combinations of audio and graphic information, and wherein conveying the information comprises conveying the at least one of the audio and the graphic information.

* * * * *